United States Patent [19]
Gerber

[11] Patent Number: 5,262,900
[45] Date of Patent: Nov. 16, 1993

[54] LASER OPTICS DEVICE

[76] Inventor: Peter Gerber, Im Unterzelg 68, CH-8965 Berikon, Switzerland

[21] Appl. No.: 839,356

[22] Filed: Feb. 20, 1992

[30] Foreign Application Priority Data

Feb. 20, 1991 [CH] Switzerland .................. 523/91

[51] Int. Cl.$^5$ ................ G02B 7/02; H01S 3/08
[52] U.S. Cl. .................. 359/811; 359/819; 372/107
[58] Field of Search ............ 359/811–830; 385/92, 93, 79; 372/34, 36, 107–109

[56] References Cited

U.S. PATENT DOCUMENTS

| | | | |
|---|---|---|---|
| 3,819,254 | 6/1974 | Hummel et al. | 359/826 |
| 4,861,137 | 8/1989 | Nagata | 359/820 |
| 4,910,741 | 3/1990 | Pillsbury et al. | 372/109 |
| 4,993,801 | 2/1991 | Sarraf | 359/820 |
| 5,042,048 | 8/1991 | Meyer | 372/107 |
| 5,114,476 | 5/1992 | Hollenbeck et al. | 372/108 |

*Primary Examiner*—Bruce Y. Arnold
*Assistant Examiner*—Thong Nguyen
*Attorney, Agent, or Firm*—Ostrolenk, Faber, Gerb & Soffen

[57] ABSTRACT

A laser optics device comprises a semiconductor laser and a lens system spaced in a defined distance from each other. The semiconductor laser and the lens system are aligned along an optical axis. To keep the laser and lens system fixed and adjusted with the optical axis in spite of thermal expansions, the semiconductor and the lens system are supported within a sleeve having axial slots. The slots extend along a substantial part of the length of the sleeve. Compressible rings are provided for radial elastic compression of the sleeve in the area of the slots. The lens system and the semiconductor laser thereby are clamped elastically in a centered position within the sleeve which is mounted within the cylindric bore of a housing member.

20 Claims, 2 Drawing Sheets

LASER OPTICS DEVICE

BACKGROUND OF THE INVENTION

1. Field of the Invention

The present invention relates to a laser optics device having a semiconductor laser and at least an optical lens positioned a defined distance from the semiconductor laser and defining an optical axis together with the semiconductor laser. In optical devices of this type it is essential that the semiconductor laser and the lens or the lens system be axially aligned as precisely as possible and during the whole period of operation. The operation of a semiconductor laser mostly is connected with substantial heat development which leads to thermal expansion of the semiconductor laser itself and of the surrounding elements as e.g. the lenses. If the semiconductor laser is fixedly mounted, it easily may be damaged and/or the laser beam may be displaced because of such thermal expansion. If, on the other hand, the semiconductor laser is supported so that thermal expansions can be absorbed, its alignment to the optical axis may be affected which makes it necessary to repeatedly adjust the laser optics.

2. Description of the Prior Art

A known laser optics device of this type is disclosed in the UK-patent specification no. 2,087,591. The semiconductor laser, as well as the lens system, are mounted within a holder. The lenses are positioned radially and very accurately within said holder. In an axial direction the lenses are positioned by means of locking elements fixed to the holder. In this construction nothing is provided to compensate for the effect of thermal expansion after a longer period of operation.

In the European patent publication no. 0 397 171 an optical device is disclosed in which two ball lenses and a light emitting diode 5 are fitted within a casing consisting of two identical halves molded from the same mold. Thereby, possible molding errors can be compensated and any molding imperfections will influence the optical precision of the device. However, no measures are disclosed to avoid the influences of thermal expansion on the precision of the alignment of the elements.

SUMMARY OF THE INVENTION

It is, therefore, a general object of the present invention to provide a new and improved laser optics device of the above type which can easily be assembled and the beam of which, even after a long period of operation remains in its initial position.

A further object of the invention is to provide a laser optics device in which the semiconductor laser and the optical lenses are kept in alignment with to each other in spite of different thermal expansion of the elements.

Still a further object of the invention is to provide a new laser optics device in which the elements, i.e. especially the semiconductor laser, are supported so that any damage due to thermal expansion is avoided.

It has been found these and still other objects can be met by a laser optics device having a semiconductor laser and at least one optical lens positioned a defined distance from the laser and arranged on an optical axis common to the optical lens and the semiconductor laser, wherein the semiconductor laser and at least one of the optical lenses are supported within a common cylindrical sleeve having at least a group of axial slots distributed over its circumference and extending along part of its length. Compression means are provided for radially compressing the sleeve in a slotted area thereof for positioning the optical lens and the laser diode within the sleeve. Preferably, the sleeve is supported within a cylindrical bore of a housing member, and at least one elastic seating member is provided between the sleeve and the cylindrical opening to maintain the sleeve in a position in which the optical axis is aligned with the axis of the cylindrical bore.

BRIEF DESCRIPTION OF THE DRAWING

The present invention will be better understood and objects other than those set forth above will become apparent when consideration is given to the following detailed description thereof. Such description makes reference to the annexed drawing, wherein.

DESCRIPTION OF THE PREFERRED EMBODIMENT

Figure 1:
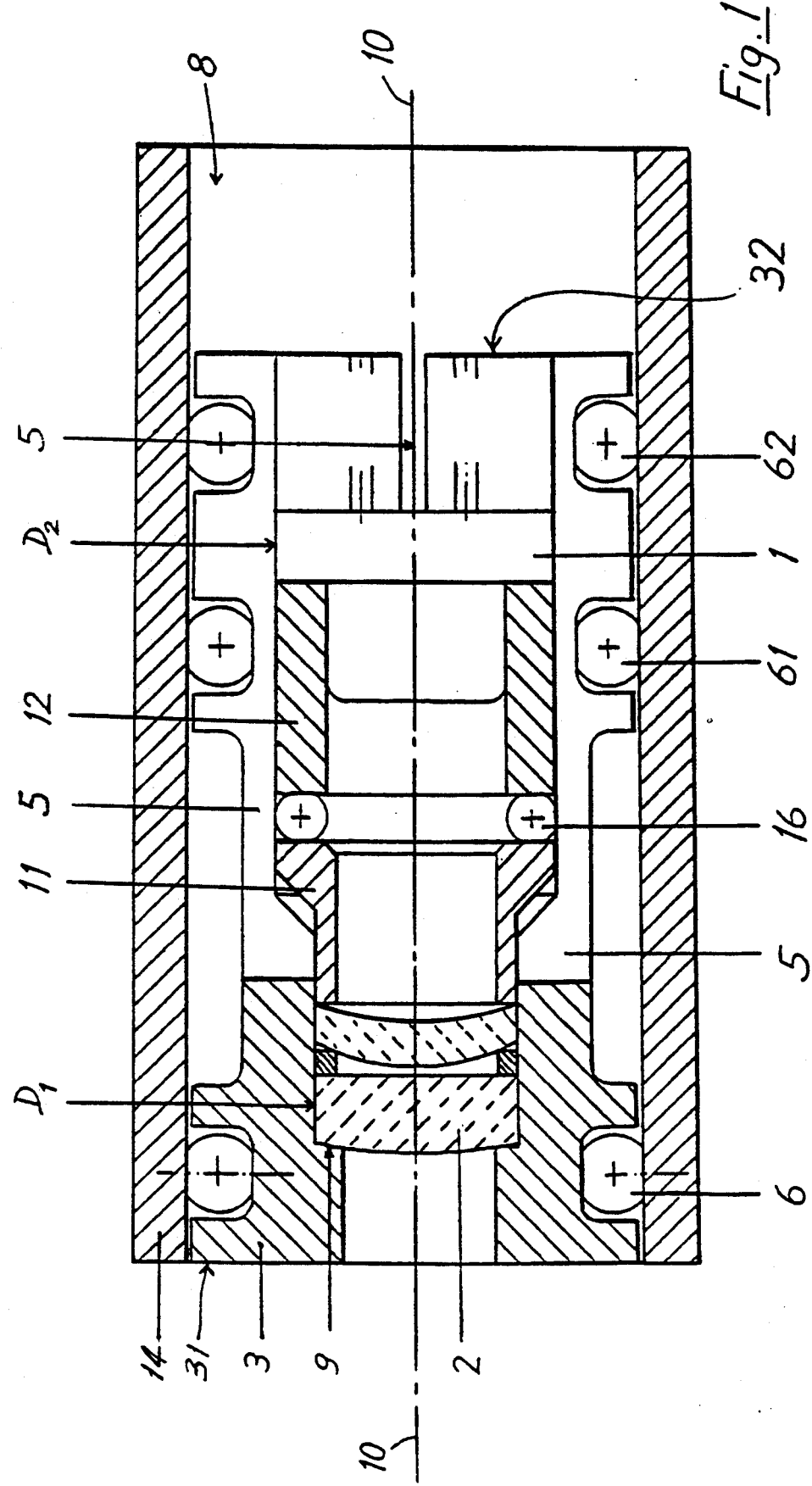
FIG. 1 is a side cross-sectional view of an embodiment of the invention.
Figure 2:
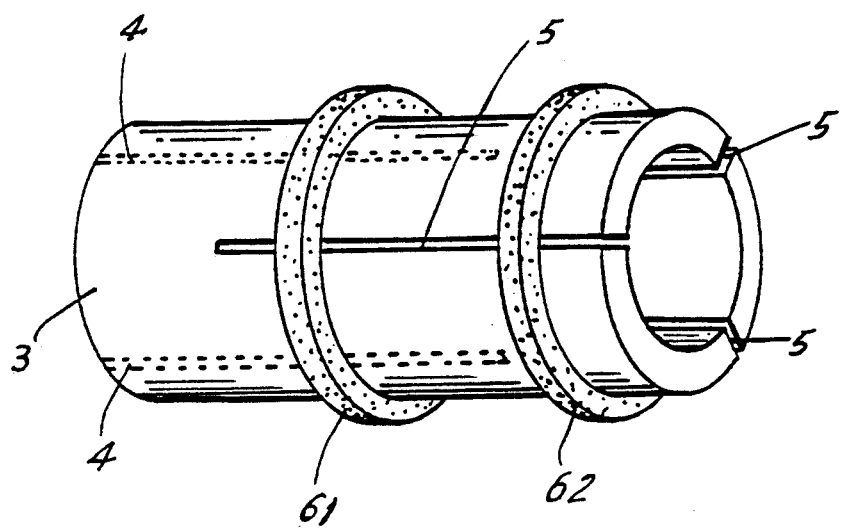
FIG. 2 is a perspective view of the slotted sleeve of the present invention.

FIG. 1 a sectional view along the optical axis 10 of a laser optics device. The optical elements comprise a lens system 2 with two focussing lenses and a laser source 1 aligned with the optical axis. The laser source is a semiconductor laser or a laser diode 1 of known type. The laser diode 1 and the lens system are arranged within a common sleeve 3 which preferably is a turned piece. As shown in FIG. 2, the sleeve is provided with two groups of axial slots 4 and 5, respectively, each of which extends along about ⅔ of the length of the sleeve. Thereby, the sleeve is divided into several radially compressible jaws, by means of which the laser diode 1 and the lens system are clamped and centered.

The sleeve 3 has a lens-side end 31 and a diode-side end 32. A first group of four axial slots 4 extends from the lens-side end 31 of the sleeve 3 over a substantial part of its length. In FIG. 1 only a short section of two of these slots 4 can be seen. This first group of slots 4 is provided for centered clamping of the lens system 2.

A second group of four slots 5, three of which can be seen in FIG. 1, extend from the diode-side end 32 of the sleeve 3 over a substantial part of its length. The second group of slots 5 allow centered clamping of the laser diode 1.

As already mentioned, each group of slots in the present embodiment comprises four slots distributed over the circumference of the sleeve with intermediate angles of 90°. The two groups of slots are staggered relative to each other by angles of 45°. It is obvious that instead of four slots each group may also comprise less or more than the four slots with the intermediate angles being changed accordingly. The slotted sleeve 3 is made of a turned piece of metal and the mentioned slots are cut into this piece from the respective ends. Therefore, the optical elements are comprised and centered within a slotted sleeve 3 formed of one piece. During assembly, the optical elements can be introduced into sleeve 3 from the rear end 32.

The inner surface of the sleeve 3 is shaped to form a shoulder 9, against which the lens system 2 is axially positioned. During assembly the lens system 2 is pushed into the sleeve 3 until it abuts against shoulder 9. Two spacer pieces 11 and 12 are then provided to press against the rear end of the lens system 2. Thereby, the lens is axially positioned a defined distance from the laser diode 1. Between the two spacer pieces 11 and 12, an elastic member 16 is arranged which is slightly axially biased in the mounted state between laser diode 1 and lens system 2 to elastically brace these elements. Thermal expansions in the axial direction can be absorbed by said elastic member 16, which preferably is a rubber ring.

In the radial direction the lens system 2 and the laser diode 1 are held and centered between the jaws formed between the slots of the slotted sleeve 3 which are pressed radially inwardly by means of elastic rings 6, 61 and 62 surrounding the slotted sleeve 3, see FIG. 2. The elastic rings 6, and 61, and 62 may be dimensioned to transmit a radial force onto the slotted sleeve. On the other hand, the radial force can also be caused by inserting the sleeve 3 with the elastic rings 6, 61 and 62 into a housing member 14 as can be seen from FIG. 1. The housing member 14 therefore has a cylindric bore 8, into which the sleeve is inserted after assembly of the optical elements.

The diameters of the cylindric bore 8 of the housing member 14 and of the sleeve 3 are dimensioned to create a certain radial play therebetween. Therefore, the sleeve 3 can radially expand within the cylindric bore 8, with the expansion being absorbed by the elastic rings 6, 61 and 62 sitting between the sleeve 3 and the cylindrical bore 8. Thereby the housing member 8 acts as a radial pressing force via the rings onto the slotted sleeve 3, which force being equally distributed over the circumference and is transmitted to the lens system 2 and the laser diode 1, respectively. Therefore, every radial thermal expansion of the optical elements 2 and the diode 1 is transmitted to and absorbed by the elastic rings 6, 61, and 62 without affecting the alignment of these elements with the optical axis.

Simultaneously, the elastic rings 6, 61 and 62 act as an electrical insulators between the sleeve 3 and the housing member 14. This is important since the outside of laser diodes are mostly connected to the positive pole of an electrical source, whereas the housing member 14 is to be connected to earth.

The elastic rings 6, 61 and 62 preferably are placed at diameter $D_1$ of the sleeve 3, at which the lens system 2 is placed and at diameter $D_2$, at which the laser diode 1 is located. Since the laser diode 1 also has to be fixed against the axial force of the biased elastic member 16, it is preferred to arrange two elastic rings 61 and 62 over the diameter $D_2$ to increase the radial clamping force.

The cylindric bore 8 therefore provides for an exact centering of the optical axis 10 to the axis of the bore 8 and maintains a radial biasing force against the slotted sleeve 3. Therefore, the sleeve 3 can expand in the radial direction for compensating the thermal expansion of the optical elements without changing the centering and without loosening the fixation of the optical elements.

The fact that the sleeve 3 and the cylindric bore 8 can be manufactured by turning allows an exactly centered mounting for the optical elements to be achieved and which can easily be assembled without the need for additional adjustment. The laser optics device can be arranged by means of the housing member 14 in respective optical devices. The housing member 14 forms a protection for the laser optics device and avoids the entrance of dust into the space between the lens system 2 and the laser diode 1.

The mounting of the laser diode 1 and the lens system 2 in a common, slotted sleeve which is compressible in a radial direction allows an adaption of the changing dimensions of the elements due to thermal expansion without influencing the position of the optical axis. Therefore, no repeated adjustments are necessary during operation. The optical axis is defined by the axis of the cylindric bore 8 of the housing member 14, into which the sleeve 3 is inserted. Therefore, assembly is very easy, in that the optical elements first are inserted into the sleeve 3 as mentioned above and the sleeve is then inserted into the cylindric bore 8 of the housing member 14, whereby an automatic centering of the axis of the cylindric bore 8 is achieved. The described laser optics device also is resistant to mechanical vibrations which do not affect the position of the optical axis.

While there is shown and described a present preferred embodiment of the invention, it is to be distinctly understood that the invention is not limited thereto, but may be otherwise variously embodied and practiced within the scope of the following claims.

What is claimed is:

1. A laser optics device, comprising:
   a cylindrical sleeve having a length and circumference;
   an optical axis extending axially through said sleeve;
   a semiconductor laser located in said sleeve and positioned on said optical axis;
   at least one optical lens disposed in said sleeve and axially positioned on said optical axis at a defined distance from said semiconductor laser;
   one or more groups of slots distributed over the circumference of said sleeve and extending axially along part of the length of the sleeve, thereby defining a slotted section of said sleeve in said part of the length of the sleeve, wherein said semiconductor laser and said at least one optical lens are located in said slotted section of said sleeve; and
   compression means located on said slotted section of said sleeve for radially compressing the sleeve and for holding said at least one optical lens and said semiconductor laser within said sleeve.

2. The laser optics device of claim 1, wherein said sleeve includes at least one shoulder for axially positioning said at least one optical lens.

3. The laser optics device of claim 1, further comprising an elastic member disposed in said sleeve between said semiconductor laser and said at least one optical lens, said elastic member being biased to produce an axial biasing force against both said semiconductor laser and said at least one optical lens, wherein axial thermal expansion of said semiconductor laser and said at least one optical lens is absorbed by said elastic member.

4. The laser optics device of claim 1, further comprising a housing member including a cylindrical bore along an axis of said housing member, said cylindrical bore having an inner diameter which is greater than an outer diameter of said sleeve, said sleeve being disposed within said cylindrical bore, and at least one elastic seating member provided between said cylindrical bore and said sleeve to maintain said sleeve in a position wherein said optical axis is in alignment with said axis of said housing member.

5. The laser optics device of claim 4, wherein said at least one elastic seating member comprises a plurality of elastic rings surrounding said sleeve, said plurality of elastic rings producing a radial pressure against said sleeve to maintain said sleeve in a centered position within said cylindrical bore.

6. The laser optics device of claim 4, wherein said elastic seating member comprises an electrically insulated material for electrically insulating said housing member from said sleeve.

7. The laser optics device of claim 4, wherein said compression means and said at least one elastic seating member are formed by a plurality of elastic rings surrounding said sleeve and arranged between said sleeve and said housing member.

8. The laser optics device of claim 7, wherein at least one of said plurality of elastic rings is arranged on said sleeve adjacent said at least one optical lens and at least one of said plurality of elastic rings is arranged on said sleeve adjacent said semiconductor laser.

9. The laser optics device of claim 7, wherein one of said plurality of elastic rings is arranged adjacent said optical lens, a second of said plurality of elastic rings is arranged on a first side of said semiconductor laser and a third of said plurality of elastic rings is arranged on a second side of said semiconductor laser.

10. A laser optics device, comprising:
  a cylindrical sleeve having a circumference and length;
  an optical axis extending axially through said sleeve;
  a semiconductor laser located in said sleeve and positioned on said optical axis;
  at least one optical lens disposed in said sleeve and axially positioned on said optical axis at a defined distance from said semiconductor laser;
  a first and second group of slots distributed over the circumference of said sleeve, said first group of slots including at least three slots which extend axially from a left side of said sleeve along a substantial part of the length of the sleeve, and said second group of slots including at least three slots extending axially from a right side of said sleeve along a substantial part of the length of the sleeve, said at least three slots of said first and second group of slots being staggered along relative angular positions; and
  compression means located on said sleeve for radially compressing the sleeve and for holding said at least one optical lens and said semiconductor laser within said sleeve.

11. The laser optics device of claim 10, wherein said at least three slots of said first and second group of axial slots extend at least over ¾ of the length of said sleeve.

12. The laser optics device of claim 10, wherein said sleeve includes at least one shoulder for axially positioning said at least one optical lens.

13. The laser optics device of claim 10, further comprising an elastic member disposed in said sleeve between said semiconductor laser and said at least one optical lens, said elastic member being biased to produce an axial biasing force against both said semiconductor laser and said at least one optical lens.

14. The laser optics device of claim 10, further comprising a housing member including a cylindrical bore along an axis of said housing member, said cylindrical bore having an inner diameter which is greater than an outer diameter of said sleeve, said sleeve being disposed within said cylindrical bore, and at least one elastic seating member provided between said cylindrical bore and said sleeve to maintain said sleeve in a position wherein said optical axis is in alignment with the axis of said housing member.

15. The laser optics device of claim 14, wherein said at least one elastic seating member comprises a plurality of elastic rings surrounding said sleeve, said plurality of elastic rings producing a radial pressure against said sleeve to maintain said sleeve in a centered position within said cylindrical bore.

16. The laser optics device of claim 14, wherein said elastic seating member comprises an electrically insulated material for electrically insulating said housing member from said sleeve.

17. The laser optics device of claim 14, wherein said compression means and said at least one elastic seating member are formed by a plurality of elastic rings surrounding said sleeve and arranged between said sleeve and said housing member.

18. The laser optics device of claim 17, wherein at least one of said plurality of elastic rings is arranged on said sleeve adjacent said at least one optical lens and at least one of said plurality of elastic rings being arranged on said sleeve adjacent said semiconductor laser.

19. The laser optics device of claim 17, wherein one of said plurality of elastic rings is arranged adjacent said at least one optical lens, a second of said plurality of elastic rings is arranged on a first side of said semiconductor laser and a third of said plurality of elastic rings is arranged on a second side of said semiconductor laser.

20. A laser optics device, comprising:
  a cylindrical sleeve having a length and circumference;
  an optical axis extending axially through said sleeve;
  a semiconductor laser located in said sleeve and positioned on said optical axis;
  at least one optical lens disposed in said sleeve and axially positioned on said optical axis at a defined distance from said semiconductor laser;
  one or more groups of slots distributed over the circumference of said sleeve and extending axially along part of the length of the sleeve, thereby defining a slotted section of said sleeve in said part of the length of the sleeve, wherein said semiconductor laser and said at least one optical lens are located in said slotted section of said sleeve;
  compression means located on said slotted section of said sleeve for radially compressing the sleeve and for holding said at least one optical lens and said semiconductor laser within said sleeve; and
  an elastic member disposed in said sleeve between said semiconductor laser and said at least one optical lens, said elastic member being biased to produce an axial biasing force against both said semiconductor laser and said at least one optical lens, wherein axial thermal expansion of said semiconductor laser and said at least one optical lens is absorbed by said elastic member.

* * * * *